United States Patent
Singh

(10) Patent No.: US 10,240,874 B2
(45) Date of Patent: Mar. 26, 2019

(54) RADIATOR TANK

(71) Applicant: DENSO International America, Inc., Southfield, MI (US)

(72) Inventor: Guriqbal Singh, Farmington Hills, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/669,332

(22) Filed: Aug. 4, 2017

(65) Prior Publication Data

US 2019/0041142 A1    Feb. 7, 2019

(51) Int. Cl.
*F28F 9/02* (2006.01)
*F28F 9/12* (2006.01)

(52) U.S. Cl.
CPC .............. *F28F 9/02* (2013.01); *F28F 9/0224* (2013.01); *F28F 9/12* (2013.01)

(58) Field of Classification Search
CPC .......... F28F 2225/08; F28F 2009/0285; F28F 9/0263; F28F 9/02; F28F 9/0209; F28F 9/0224; F28F 9/0226; F28F 9/04; F28F 9/0268; F28F 2275/126; F28F 21/00; F28F 21/06; F02B 29/0456; F28D 1/05366
USPC ........................................................ 165/173
See application file for complete search history.

(56) References Cited

U.S. PATENT DOCUMENTS

| | | |
|---|---|---|
| 4,289,507 A | 9/1981 | Cadars et al. |
| 5,351,751 A | 10/1994 | Cage et al. |
| 6,006,825 A | 12/1999 | Kitazaki |
| 6,082,439 A | 7/2000 | Kato et al. |
| 6,116,335 A | 9/2000 | Beamer et al. |
| 6,257,325 B1 | 7/2001 | Watanabe et al. |
| 6,283,200 B1 | 9/2001 | Sugimoto et al. |
| 6,786,275 B2 * | 9/2004 | Dey .............. F28D 1/0535 165/149 |
| 7,222,501 B2 | 5/2007 | Cho et al. |
| 7,367,203 B2 | 5/2008 | Katoh et al. |
| 7,954,543 B2 | 6/2011 | Hernandez et al. |
| 2007/0017664 A1 | 1/2007 | Beamer et al. |
| 2008/0164015 A1 | 7/2008 | Papapanu |
| 2010/0282449 A1 | 11/2010 | Merklein et al. |
| 2013/0025838 A1 * | 1/2013 | Kato .............. F28D 1/05366 165/173 |
| 2013/0168069 A1 * | 7/2013 | Ranes .............. F28F 9/0224 165/173 |
| 2015/0014324 A1 | 1/2015 | Oono et al. |
| 2015/0283895 A1 | 10/2015 | Takahashi |

FOREIGN PATENT DOCUMENTS

| | | | | |
|---|---|---|---|---|
| JP | 10267588 A | * | 10/1998 | ............ F28F 9/0212 |
| JP | 11281293 A | * | 10/1999 | ............ F28F 9/0224 |
| JP | WO 2008023569 A1 | * | 2/2008 | ............ F28F 9/0224 |

* cited by examiner

*Primary Examiner* — Tho V Duong
(74) *Attorney, Agent, or Firm* — Harness, Dickey & Pierce, P.L.C.

(57) ABSTRACT

A radiator tank for a radiator including a first sidewall having a first end portion, a second end portion, and a center portion between the first end portion and the second end portion. The center portion is recessed inward relative to the first end portion and the second end portion towards an inner volume defined by the radiator tank.

15 Claims, 2 Drawing Sheets

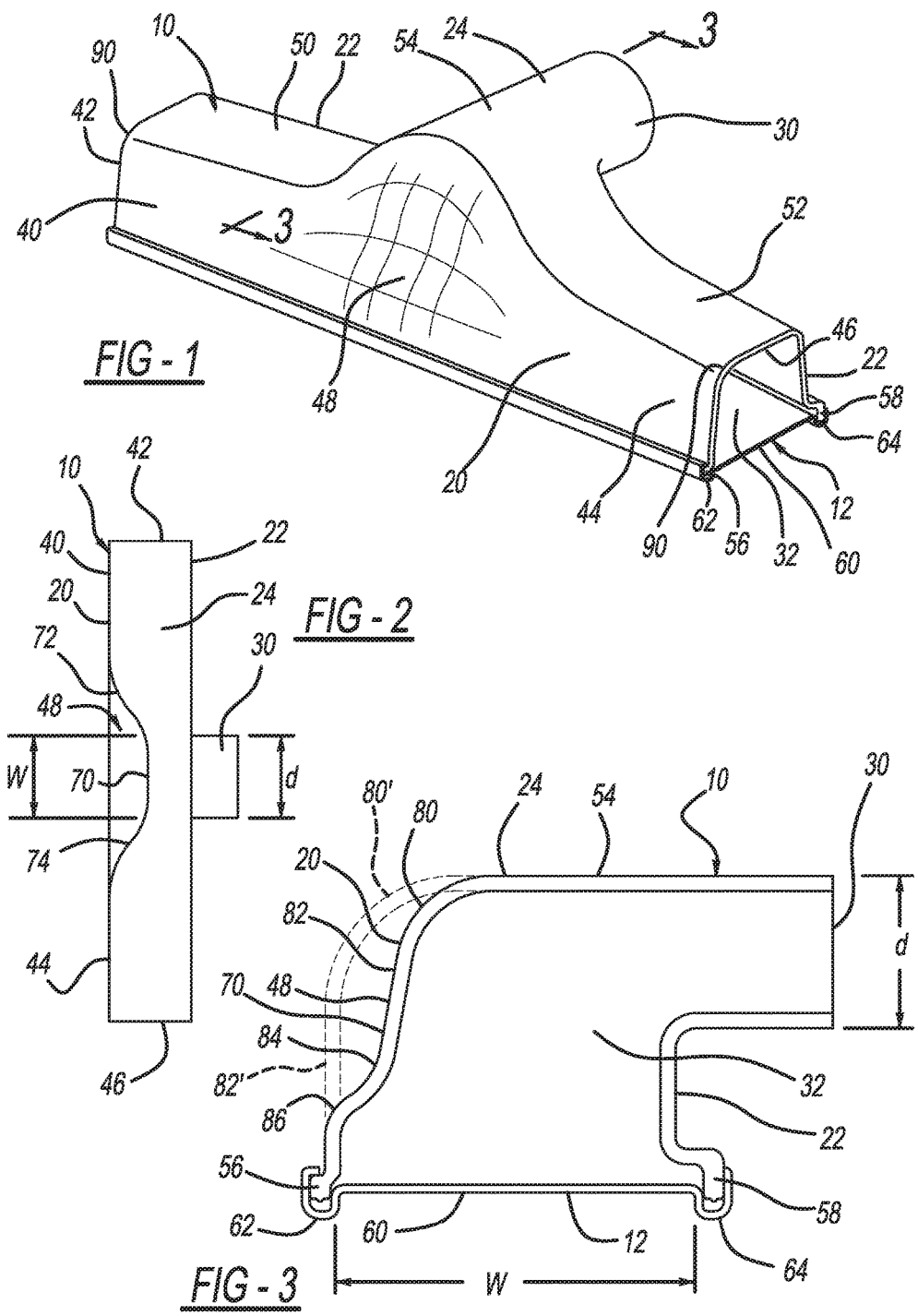

RADIATOR TANK

FIELD

The present disclosure relates to a radiator tank.

BACKGROUND

This section provides background information related to the present disclosure, which is not necessarily prior art.

Industry standards for radiators are moving towards requiring wider core plates and larger radiator tank ports, which helps to improve fuel economy. Increasing the core plate width and the port diameter can result in increased stress on the core plate, which may cause premature fatigue of the core plate and/or walls of the radiator tank. There is thus a need in the art for a radiator tank having an increased width and port diameter, as well as stronger walls that reduce pressure stress on the core plate, thus reducing the likelihood of premature core plate fatigue. The present teachings advantageously provide for a radiator tank that does not impart undue stress on the core plate, has an increased port size, and an increased width. One skilled in the art will recognize that the present teachings provide for numerous other advantages as well.

SUMMARY

This section provides a general summary of the disclosure, and is not a comprehensive disclosure of its full scope or all of its features.

The present teachings include a radiator tank for a radiator having a first sidewall with a first end portion, a second end portion, and a center portion between the first end portion and the second end portion. The center portion is recessed inward relative to the first end portion and the second end portion towards an inner volume defined by the radiator tank Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 1 is a perspective view of a radiator tank according to the present teachings mounted to a core plate;

FIG. 2 is a top view of the radiator tank of FIG. 1;

FIG. 3 is a cross-sectional view taken along line 3-3 of FIG. 1, with a prior art radiator tank center sidewall illustrated in phantom;

Corresponding reference numerals indicate corresponding parts throughout the several views of the drawings.

DETAILED DESCRIPTION

Figure 4:
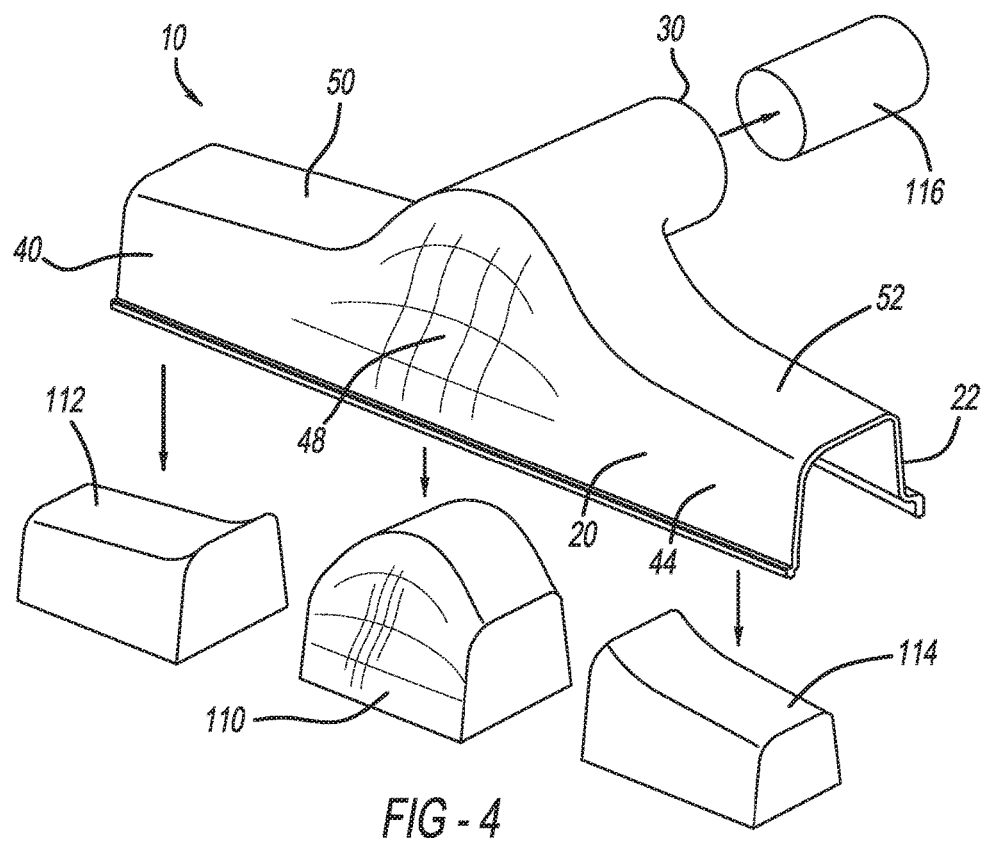
FIG. 4 is a perspective view of the radiator tank according to the present teachings, and dies for forming the radiator tank.

Example embodiments will now be described more fully with reference to the accompanying drawings.

With initial reference to FIG. 1, a radiator tank according to the present teachings is illustrated at reference numeral 10. The radiator tank 10 is configured to be coupled to a radiator core plate 12 of a radiator. The radiator tank 10 according to the present teachings can be used with any suitable radiator, and thus the radiator core plate 12 can be the core plate of any suitable radiator, such as the radiator of any suitable vehicle including any suitable passenger vehicle, mass transit vehicle, construction vehicle, commercial vehicle, recreational vehicle, military vehicle, aircraft, watercraft, etc. The radiator tank 10 is also suitable for use with non-vehicular radiators, such as radiators included with any suitable cooling systems, engines, and/or machinery.

The radiator tank 10 generally includes a first sidewall 20 and a second sidewall 22, which is generally opposite to the first sidewall 20. An upper portion 24 extends between the first sidewall 20 and the second sidewall 22, and generally defines an upper surface of the radiator tank 10. Extending generally from the second sidewall 22 is a port 30, which is in communication with an inner volume 32 defined by the radiator tank 10.

The first sidewall 20 includes a first end or side portion 40, which extends inward from a first end 42 of the radiator tank 10. The first sidewall 20 also includes a second end or side portion 44, which extends inward from a second end 46 of the radiator tank 10. Between the first end 40 and the second end 44 of the first sidewall 20 is a center portion 48 of the first sidewall 20. The center portion 48 is generally opposite to the port 30.

The upper portion 24 of the radiator tank 10 includes a first end or side portion 50 and a second end or side portion 52. The upper portion 24 further includes a center portion 54, which is generally aligned with the port 30, and is between the first and second end/side portions 50 and 52. The center portion 54 is generally curved or rounded, with a highest portion thereof generally midway between the first and second ends 42 and 46 of the radiator tank 10. The center portion 54 slopes relatively downward to each of the first and second end/side portions 50 and 52.

The first sidewall 20 includes a first flange 56, which is at an end of the first sidewall 20 opposite to the upper portion 24. The second sidewall 22 includes a second flange 58, which is at an end of the second sidewall 22 opposite to the upper portion 24. The first and second flanges 56 and 58 extend generally along the respective lengths of the first and second sidewalls 20 and 22. The first and second flanges 56 and 58 cooperate with the radiator core plate 12 in order to secure the radiator tank 10 to the radiator core plate 12. Specifically, the radiator core plate 12 includes a base 60, a first receptacle 62, and a second receptacle 64 (see FIGS. 1 and 3). The first and second receptacles 62 and 64 are on opposite sides of the base 60. The first flange 56 is configured to be coupled to the first receptacle 62, and the second flange 58 is configured to be coupled to the second receptacle 64 in any suitable manner in order to secure the radiator tank 10 to the radiator core plate 12.

With additional reference to FIG. 2, the center portion 48 of the first sidewall 20 further includes a center surface 70, which is opposite to the port 30. The center surface 70 is between a first inwardly sloping surface 72 and a second inwardly sloping surface 74 of the center portion 48. The first inwardly sloping surface 72 extends from the first end/side portion 40 inward to the center surface 70. The second inwardly sloping surface 74 extends from the second end/side portion 44 inward to the center surface 70. The center surface 70 is thus recessed inward relative to the first end/side portion 40 and the second end/side portion 44 of the first sidewall 20. The center surface 70 has a width "w" that is substantially similar to, or the same as, a diameter "d" of the port 30.

With reference to FIG. 3, the center portion 48 of the first sidewall 20 further includes an upper curved portion 80, which extends from the upper portion 24 and curves downward towards the first flange 56. Extending away from the upper curved portion 80 is a sloped, slanted or angled portion 82, which generally slopes outward and away from the inner volume 32 as the portion 82 extends from the upper curved portion 80 towards the first flange 56. The portion 82 transitions to an intermediate curved portion 84, which curves outward and away from the inner volume 32. A lower curved portion 86 curves downward from the intermediate curved portion 84 towards the first flange 56.

FIG. 3 illustrates in phantom a shape of a prior art radiator tank sidewall, and thus clarifies the difference in shape between the center portion 48 according to the present teachings and a prior art radiator tank sidewall. The prior art sidewall includes an upper curved portion 80', which transitions to a linear portion 82'. The linear portion 82' is aligned with the first flange 56 and extends straight down to the first flange 56. The linear portion 82' is arranged generally perpendicular to the core plate. The prior art sidewall is different from the localized center portion 48 according to the present teachings, which is generally recessed inward relative to the first and second ends/side portions 40 and 44 towards the inner volume 32 of the radiator tank 10, and slopes inward from the first flange 56, as most clearly illustrated in FIG. 3. The recessed and inwardly sloped center portion 48 according to the present teachings is localized, and thus the first and second ends/side portions 40 and 44 have a shape that approximates the prior art shape illustrated in phantom in FIG. 3. Specifically, the first and second ends/side portions 40 and 44 extend generally linearly to the first flange 56 from upper curved portion 90, which curves downward from the upper portion 24.

The shape of the center portion 48 according to the present teachings provides numerous advantages. For example, the shape of the center portion 48 increases the stiffness of the radiator tank 10, particularly at the area of the center portion 48. As a result, the radiator tank 10 is able to withstand additional pressures within the inner volume 32, and reduce pressure stress on the radiator core plate 12. The diameter "d" of the port 30 and the width "w" of the radiator core plate 12 can thus be increased relative to prior art radiator tanks. The increased diameter "d" and width "w" can advantageously lead to fuel economy and emissions improvement. Increasing the width "w" of the radiator core plate 12 also increases core plate overhang, which advantageously reduces thermal stress.

Figure 5:
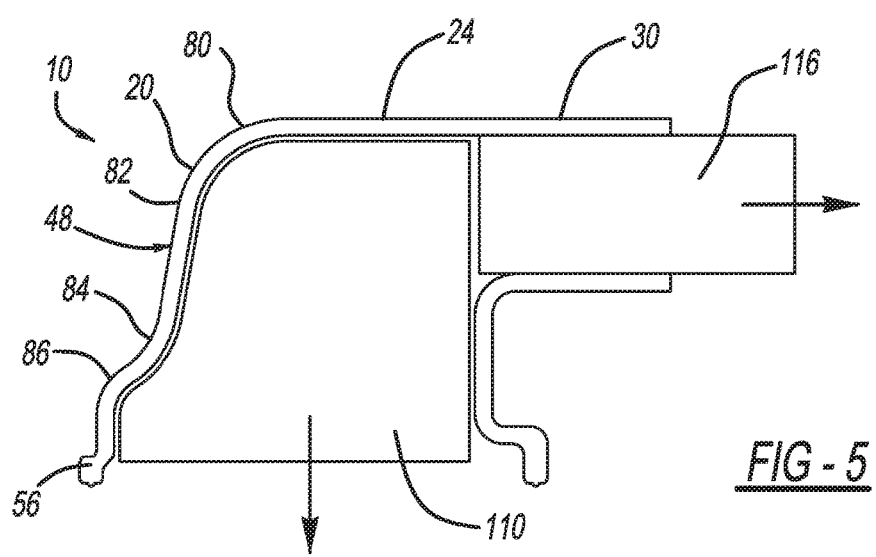
FIG. 5 is a cross-sectional view of the radiator tank according to the present teachings and dies for forming the radiator tank.

The radiator tank 10 can be formed in any suitable manner of any suitable material. For example, the radiator tank 10 can be formed of any suitable polymeric material. The radiator tank 10 can be formed using a series of dies. As illustrated in FIGS. 5 and 6, the dies can include a center die 110, a first side die 112, a second side die 114, and a port die 116. The center die 110 has a shape that corresponds to the shape of the center portion 48 of the first sidewall 20, as well as the center portion 54 of the upper portion 24 and the portion of the second sidewall 22 opposite to the center portion 48 of the first sidewall 20. The first side die 112 and the second side die 114 each have shapes that correspond to the portions of the radiator tank 10 on opposite sides of the center portion 48. The port die 116 has a shape corresponding to the port 30. After the radiator tank 10 is formed, the center die 110 is moved downward, and the first and second side dies 112 and 114 are moved outward and away from one another in the direction of the arrows illustrated in FIG. 6. The port die 116 is moved in a direction generally perpendicular to the directions that the first and second side dies 112 and 114 move.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A radiator tank for a radiator comprising:
a first sidewall including a first end portion, a second end portion, and a center portion between the first end portion and the second end portion, the center portion is recessed inward relative to the first end portion and the second end portion towards an inner volume defined by the radiator tank;
wherein the center portion includes a center surface having:
an upper curved portion that curves downward from an upper surface of the radiator tank;
a center portion that extends from the upper curved portion and slopes outward, away from an inner volume defined by the radiator tank;
an intermediate curved portion that curves outward from the inner volume as the intermediate curved portion extends from the center portion; and
a lower curved portion that curves downward towards a flange of the sidewall as the lower curved portion extends from the intermediate curved portion.

2. The radiator tank of claim 1, further comprising:
a second sidewall opposite to the first sidewall; and
an upper portion between the first sidewall and the second sidewall;
wherein the first sidewall, the second sidewall, and the upper portion define an interior volume of the radiator tank.

3. The radiator tank of claim 2, further comprising a port extending from the second sidewall;
wherein the center portion of the first sidewall is opposite to the port.

4. The radiator tank of claim 2, wherein the flange is a first flange, the radiator tank further comprising:
the first flange extending a length of the first sidewall; and
a second flange extending a length of the second sidewall;
wherein the first flange and the second flange are configured to cooperate with a radiator core plate to connect the radiator tank to the core plate.

5. The radiator tank of claim 1, wherein the center portion of the first sidewall further includes:
a first sloped surface that slopes from the first end portion inward towards the inner volume defined by the radiator tank;
a second sloped surface that slopes from the second end portion inward towards the inner volume defined by the radiator tank; and the center surface between the first sloped surface and the second sloped surface, the first sloped surface slopes inward to the center surface, and the second sloped surface slopes inward to the center surface.

6. The radiator tank of claim 5, further comprising a port extending from the second sidewall, the port is opposite to the center surface.

7. The radiator tank of claim 6, wherein the center surface has a maximum width that is the same as a maximum diameter of the port.

8. A radiator tank for a radiator comprising:
a port;
a sidewall including a first side portion, a second side portion, and a center portion between the first side portion and the second side portion, the center portion is opposite to the port and is recessed inward, relative to the first side portion and the second side portion, towards the port;
wherein the center portion includes a center surface having:
an upper curved portion that curves downward from an upper surface of the radiator tank;
a center portion that extends from the upper curved portion and slopes outward, away from an inner volume defined by the radiator tank;
an intermediate curved portion that curves outward from the inner volume as the intermediate curved portion extends from the center portion; and
a lower curved portion that curves downward towards a flange of the sidewall as the lower curved portion extends from the intermediate curved portion.

9. The radiator tank of claim 8, wherein the center portion of the sidewall further includes:
a first sloped surface that slopes from the first side portion inward towards an inner volume defined by the radiator tank;
a second sloped surface that slopes from the second side portion inward towards the inner volume defined by the radiator tank; and
the center surface between the first sloped surface and the second sloped surface, the first sloped surface slopes inward to the center surface, and the second sloped surface slopes inward to the center surface.

10. The radiator tank of claim 9, wherein the center surface has a maximum width that is the same as a maximum diameter of the port.

11. The radiator tank of claim 8, wherein the flange is one of a pair of flanges configured to be received by a radiator core plate, one of the pair of flanges extending along a length of the sidewall.

12. The radiator tank of claim 9, wherein the center surface of the sidewall is directly opposite to the port.

13. The radiator tank of claim 8, wherein the radiator tank is formed of a polymeric material.

14. The radiator tank of claim 8, wherein the port is formed with a port die, and a body of the radiator tank is formed with three dies.

15. A radiator tank for a radiator comprising:
a port;
a sidewall including a first side portion, a second side portion, and a center portion between the first side portion and the second side portion, the center portion is opposite to the port and is recessed inward, relative to the first side portion and the second side portion, towards the port; and a pair of flanges configured to be received by a radiator core plate, one of the pair of flanges extending along a length of the sidewall;

wherein the center portion of the sidewall further includes:
- a first sloped surface that slopes from the first side portion inward towards an inner volume defined by the radiator tank;
- a second sloped surface that slopes from the second side portion inward towards the inner volume defined by the radiator tank; and
- a center surface between the first sloped surface and the second sloped surface, the center surface is generally planar, the first sloped surface slopes inward to the center surface, and the second sloped surface slopes inward to the center surface;

wherein the center surface includes:
- an upper curved portion that curves downward from an upper surface of the radiator tank;
- a center portion that extends from the upper curved portion and slopes outward, away from an inner volume defined by the radiator tank;
- an intermediate curved portion that curves outward from the inner volume as the intermediate curved portion extends from the center portion; and
- a lower curved portion that curves downward towards the one of the pair of flanges of the sidewall as the lower curved portion extends from the intermediate curved portion.

\* \* \* \* \*